M. McKENZIE.
FASTENING DEVICE SUITABLE FOR SHIPS' PORTS.
APPLICATION FILED JULY 24, 1913.

1,097,249.

Patented May 19, 1914.

2 SHEETS—SHEET 1.

Witnesses:
E. R. Peck
L. L. Dunker

Inventor:
Mordey McKenzie
by Herbert E. Peck
atty

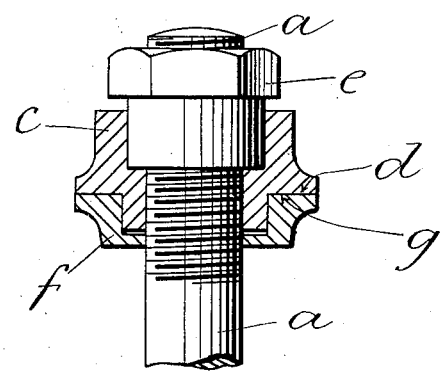
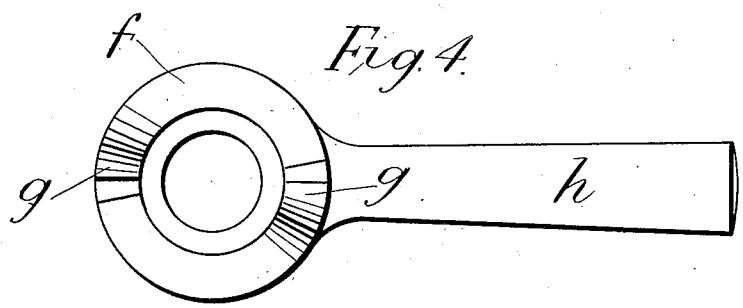
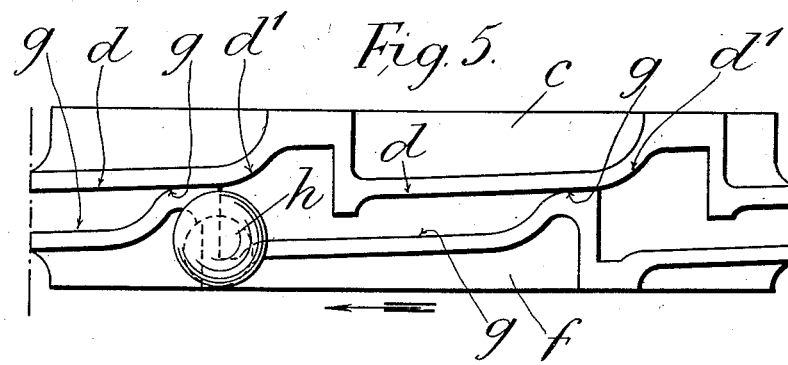

UNITED STATES PATENT OFFICE.

MORDEY McKENZIE, OF STAITHES, ENGLAND, ASSIGNOR TO HIMSELF, AND HORACE GLADSTONE WILLIAMS, OF HUNGERFORD, ENGLAND.

FASTENING DEVICE SUITABLE FOR SHIPS' PORTS.

1,097,249.

Specification of Letters Patent. Patented May 19, 1914.

Application filed July 24, 1913. Serial No. 780,931.

*To all whom it may concern:*

Be it known that I, MORDEY McKENZIE, a subject of the King of Great Britain and Ireland, residing at Staithes, in the county of York, England, have invented Improvements in Fastening Devices Suitable for Ships' Ports, of which the following is a specification.

This invention relates to fastening devices suitable for ships' ports, hinged shutters and other applications.

The object of the invention is to provide a simple and efficient fastener capable of being operated easily and quickly and adapted to force the port glass frame, or other article to which it is applied, against its seat with any desired degree of pressure determined by the adjustment of the device which is variable within wide limits. For this purpose according to the invention the fastening device comprises a cam adapted to be fixed in any desired position on a screw or other member, which may be hinged to enable it to be moved out of the way, and a coacting cam arranged to move relatively to the fixed cam and adapted to bear on the port frame or other article to be fastened, the movable cam forcing the frame or the like against its seat by exerting a wedge like action between the fixed cam and the said frame or the like.

Conveniently the cams are constituted by cam faces or collars or the like mounted on a hinged screw, the cam surfaces being each formed as a screw thread or helix of varying pitch. One such collar is screwed on the screw and is associated with a lock nut for fixing it in any desired position on the screw while the other collar is freely mounted on the screw and is provided with a handle or other device for convenience in manipulation. The pitch of the cam surfaces is with advantage such that in rotating the movable cam in an operative direction the said movable cam is moved quickly toward the port frame or other article during the first part of the movement but toward the close of the operation the said forward movement is at a much slower rate, the leverage being increased.

Figure 1:
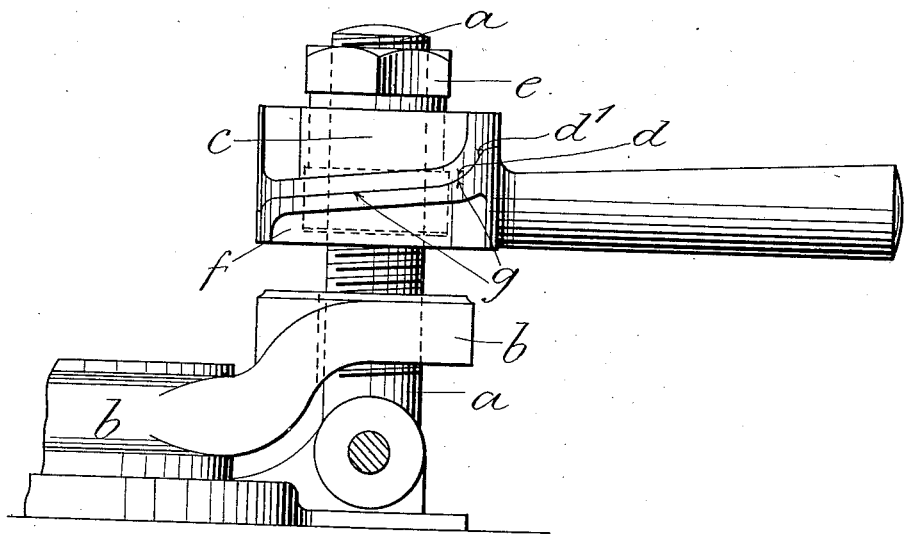
Figure 2:
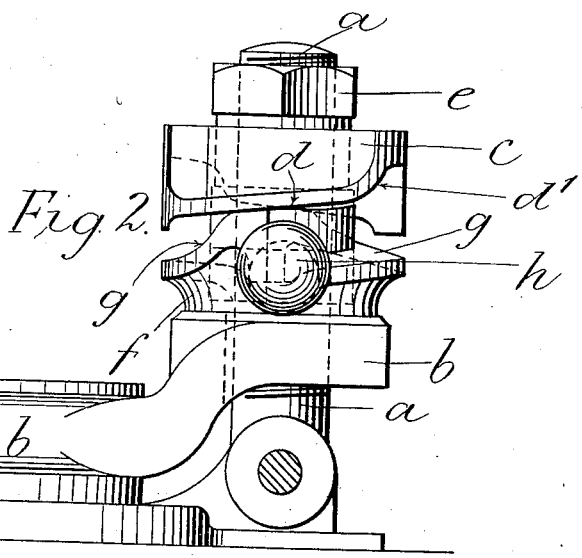

Figure 1 of the accompanying illustrative drawings shows in plan one construction of fastening device according to this invention applied to a ship's port, the device being in its disengaged or free position. Fig. 2 is a similar view to Fig. 1 showing the device in its engaged or fastened position. Fig. 3 is a sectional elevation in a plane at right angles to that of Fig. 1. Fig. 4 is an end view of the rotary part of the fastening. Fig. 5 is a developed view of the periphery of the two cam collars.

$a$ indicates the hinged fastening screw of a ship's port and $b$ the frame of the port within a recess or forked part of which the screw $a$ is adapted to enter. Threaded on the screw $a$ is a collar $c$ formed with cam surfaces $d$ and above the said collar is a lock nut $e$ adapted to firmly lock the collar $c$ in any position on the screw $a$ to which it has been adjusted. Between the collar $c$ and the port frame $b$ there is mounted to freely rotate on the screw $a$ a rotary collar $f$ formed with cam surfaces $g$ adapted to work against the cam surfaces $d$ of the adjustable collar $c$. Projecting from the rotary collar $f$ is an operating handle $h$. The cam surfaces $d$ each consist of a portion $d^1$ of rapid pitch on which the corresponding cam face $g$ of the rotary collar $f$ works at the commencement of a fastening operation, and a portion $d$ of slow pitch on which the rotary cam works with consequently increased leverage toward the close of the fastening operation. By suitably adjusting the position of the cam collar $c$ the force with which the glass frame $b$ is pressed against the rubber joint ring can be so regulated that while excessive strain such as to possibly result in breakage of the glass is avoided yet a perfectly weather tight joint can be maintained.

What I claim is:—

1. In a fastening device suitable for ships' ports, a screw, an abutment cam adjustable on said screw, means for fixing said abutment cam on said screw after adjustment, and a tightening cam arranged on said screw below said abutment cam.

2. In a fastening device suitable for ships' ports, a screw, an abutment cam adjustable on said screw, means for fixing said abutment cam on said screw after adjustment, and a tightening cam arranged to rotate on said screw below said abutment cam.

3. In a fastening device suitable for ships' ports, a screw, an abutment cam working on said screw, a lock nut to fix said abutment cam in position after adjustment, and a tightening cam mounted to rotate on said screw against said abutment cam.

4. In a fastening device suitable for ships' ports, a hinged fastening screw an abutment cam working on said screw, a lock nut to fix said abutment cam in position after adjustment, and a tightening cam mounted to rotate on said screw against said abutment cam.

5. In a fastening device suitable for ships' ports, a fastening screw, a collar screwed on said screw, a cam face on said collar, a lock nut arranged on said screw, a collar freely mounted on said screw, and a cam face on said freely mounted collar adapted to work against the said cam face of said screwed collar.

6. In a fastening device suitable for ships' ports, a fastening screw, a collar screwed on said screw, a cam face on said collar formed as a screw thread of varying pitch, a lock nut on said screw, a collar freely mounted on said screw, and a cam face on said freely mounted collar formed as a screw thread of varying pitch adapted to work against the said cam face of said screwed collar.

7. In a fastening device suitable for ships' ports, a fastening screw, a collar screwed on said screw, a cam face on said collar formed as a screw thread of varying pitch, a lock nut on said screw, a collar freely mounted on said screw, a cam face on said freely mounted collar formed as a screw thread of varying pitch adapted to work against the said cam face of said screwed collar and an operating handle on said freely mounted collar.

8. In a fastening device suitable for ships' ports, a fastening screw, a fixed pivot to which said screw is hinged, a hinged port frame formed with a recess into which said screw is adapted to enter when said frame is closed, a collar screwed on said screw, a cam face on said collar formed as a screw thread of varying pitch, a lock nut on said screw, a collar freely mounted on said screw, and a cam face on said freely mounted collar formed as a screw thread of varying pitch adapted to work against the said cam face of said screwed collar.

9. In a fastening device suitable for ships' ports, a fastening screw, a fixed pivot to which said screw is hinged, a hinged port frame formed with a recess into which said screw is adapted to enter when said frame is closed, a collar screwed on said screw, a cam face on said collar formed as a screw thread of varying pitch, a lock nut on said screw, a collar freely mounted on said screw, a cam face on said freely mounted collar formed as a screw thread of varying pitch adapted to work against the said cam face of said screwed collar and an operating handle on said freely mounted collar.

Signed at Cardiff, Wales, Great Britain, this tenth day of July 1913.

MORDEY McKENZIE.

Witnesses:
ALBERT S. PHILLIPS,
ALEXANDER W. VENNOCK.